C. N. GILMORE.
NUT LOCKING MECHANISM.
APPLICATION FILED APR. 27, 1908.
920,947. Patented May 11, 1909.
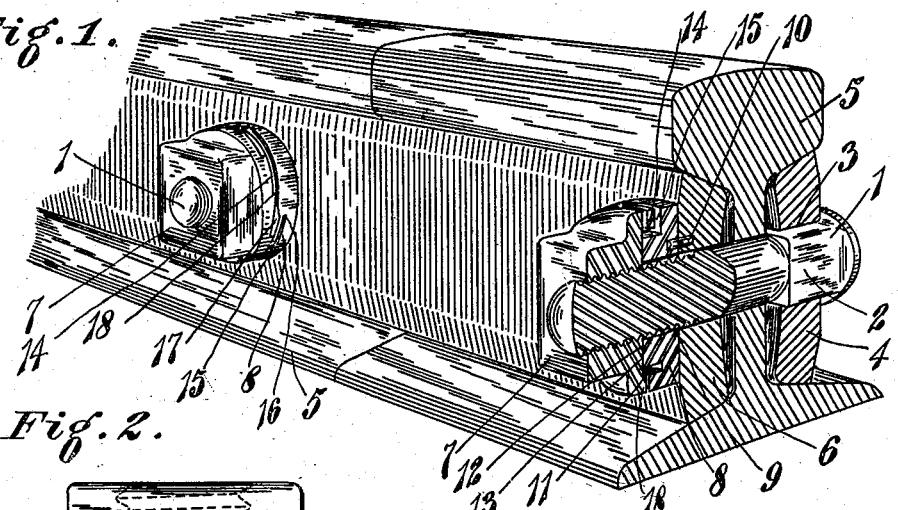
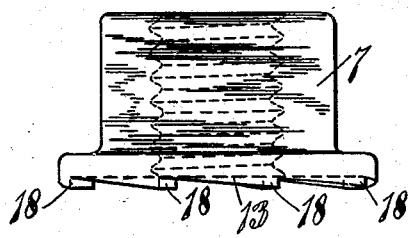
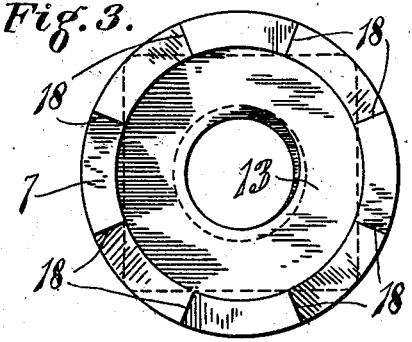
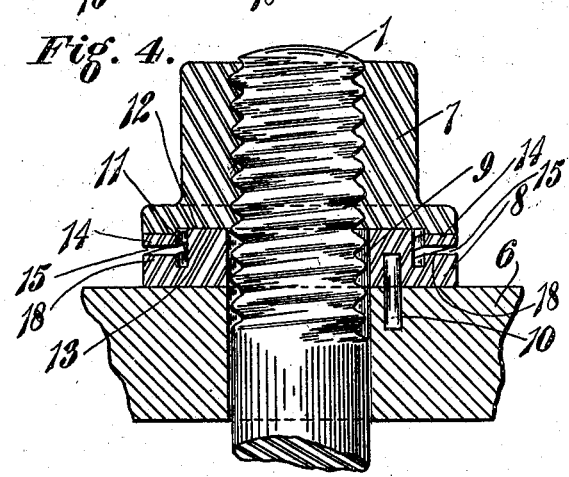
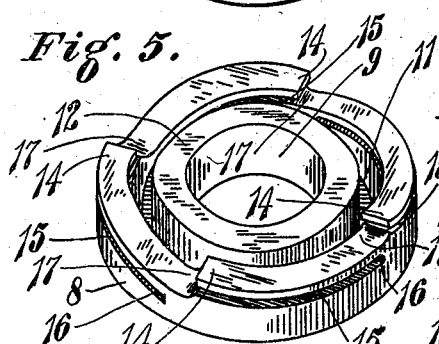
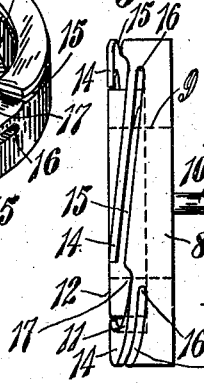
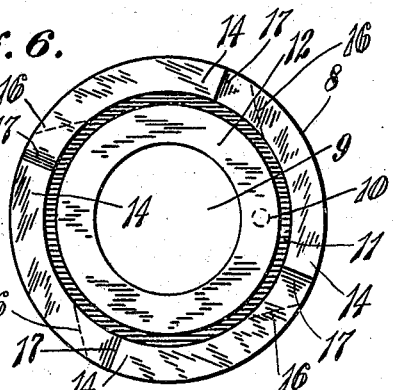
Witnesses:
Clarence Perdew
Stella Rutz
Inventor
Clifford N. Gilmore
By James N. Ramsey
Attorney

UNITED STATES PATENT OFFICE.

CLIFFORD N. GILMORE, OF CINCINNATI, OHIO.

NUT-LOCKING MECHANISM.

No. 920,947.  Specification of Letters Patent.  Patented May 11, 1909.

Application filed April 27, 1908. Serial No. 429,308.

*To all whom it may concern:*

Be it known that I, CLIFFORD N. GILMORE, a citizen of the United States, residing at Cincinnati, in the county of Hamilton and State of Ohio, have invented certain new and useful Improvements in Nut-Locking Mechansims, of which the following is a specification.

My invention relates to means for locking nuts on bolts, and its object is to accomplish such results by a simple construction, being more particularly designed for use where it is desired that the nut remain in permanently tightened position, and where there is no necessity of removing it, such as in track construction, for fish plates holding the ends of the rails together.

My invention consists in the combination with a bolt having threads and a part to be held in position by means of the bolt, of two engaging members, one of which is provided with threads corresponding to the threads on the bolt and adapetd to operatively engage therewith, and the other of which is held stationary with respect to the bolt and the part to be held in position, one of said engaging members being provided with rigid teeth, and the other with yieldable lugs adapted to engage with the teeth in the manner and with the additional details of construction as will hereinafter be more fully described and claimed.

In the drawing: Figure 1 is a sectional perspective view of part of a railroad track illustrating the use of my improved nut locking mechanism in conjunction therewith. Fig. 2 is a side elevation, and Fig. 3 is an elevation of the inner face of the nut. Fig. 4 is an enlarged sectional view of the mechanism, part of the bolt being shown in elevation. Fig. 5 is a detail perspective view of the washer. Fig. 6 is an elevation of the outer face of the washer. Fig. 7 is a side elevation of the washer.

As I prefer to construct my improvement and as illustrated in conjunction with the fish plates of a railroad track, the bolt 1 is provided with means for preventing its turning with respect to the fish plate and the track, such as by the squared part 2 adjacent to its head, fitting into a squared opening 3 in the fish plate 4, and extends through the rail 5 and the other fish plate 6, as usual. Also, as usual, the end which protrudes past the fish plate 6 is threaded, and a nut 7 has corresponding threads adapted to operatively engage with the threads on the bolt 1 to direct the nut toward the fish plate 6. Interposed between the nut 7 and the fish plate 6 is the annular washer 8 surrounding the bolt 1 and concentric thereto, its central opening 9 being of sufficient diameter to allow the bolt to pass freely through it. This washer 8 is held from turning with respect to the nut 1 and to the track, preferably, by means of a dowel pin 10 taking into the fish plates 6 and into the adjacent inner face of the washer 8 near the bolt 1.

The outer face of the washer is provided with an annular groove 11 substantially concentric to the bolt 1, dividing the outer face of the washer into two parts, the inner one of which, between the annular groove 11 and the opening which admits the bolt 1, is left solid and smooth to form the bearing surface 12 of the washer, which must bear the strain imposed on the bolt 1 to hold the fish plates 4 and 6 rigidly together, by means of the nut 7, which is drawn against the washer 8 on the threads of the bolt, as above stated, and which nut 7 has a corresponding smooth bearing surface 13, adapted to contact with the bearing surface 12 of the washer. The part of the outer face between the annular groove 11 and the periphery of the washer is caused to form a series of yieldable lugs 14 by means of a series of incisions 15 in the convex surface of the washer, extending in a direction inclined to the axis of the washer 8 and of the bolt 1 which it surrounds. These incisions 15 are of such depth that their bottoms or terminations 16 are tangential to the convex wall of the annular groove 11 in the washer at a point midway of their length so that they open into this annular groove 11 and leave the parts of the lugs 14, near the outer ends, yieldable, and the lugs attached to the washer adjacent to the terminations 16 of the incisions, so that the washer and lugs are formed integrally. The part of the outer face of the washer forming these lugs is also preferably provided with a series of recesses 17, each beginning in the region of the termination 16 of one of the incisions 15 and diminishing in depth toward the end of the yieldable lug 14 formed by means of the incision, so that the outer surface of the yieldable lug is substantially parallel to the inner surface in the incision. These recesses 17 serve to admit the ratchet teeth 18 which are formed on the inner surface of the nut 7, in a series concentric to the bolt 1, and in such position and in such number that they will register with the ends of the yieldable lugs 14 on the washer when the nut 7 is drawn toward the washer, as above noted. Preferably, the diametrical width of the ratchet teeth 18 is substantially the same as the diametrical width of the yieldable lugs. However, these teeth may vary in width, but must not be of such width as to engage with the part of the washer which forms the bearing surface 12 when the nut is drawn into position, it being required that this plain bearing surface 12 on the washer shall engage with the corresponding plain bearing surface 13 on the nut. The teeth 18, being admitted into the recesses 17, allow the bearing surfaces 12 and 13 on the washer and nut, respectively, to make perfect contact, taking the pressure independently of the yieldable lugs 14 on the washer.

Constructed as above specified, when the nut 7 is rotated and drawn along the bolt 1 by means of the threads thereon, as it approaches the washer 8, its ratchet teeth 18 will successively engage with the yieldable lugs 14 on the washer, which yieldable lugs first yield inwardly, in a direction parallel to the axis of the bolt to allow the teeth to pass, and then press outwardly and present their free ends behind the teeth in such a manner that the nut cannot be rotated backward. The turning of the nut being continued in this manner, when it is brought with its plain bearing surface 13 tightly against the plain bearing surface 12 on the washer, imposing sufficient strain on the bolt 1 to hold the fish plates 4 and 6 tightly against the rail 5, and the turning of the nut being terminated at a point where the ends of the yieldable lugs are closely adjacent or against corresponding ratchet teeth on the nut, the nut cannot be turned backward, and the tension on the bolt 1 cannot be decreased by this means. The turning of the nut should always be terminated as above described, so that the ratchet teeth and the ends of the yieldable lugs engage, and for this reason it is desirable that a sufficient number of ratchet teeth be provided to afford a nice adjustment of the nut with respect to the washer without imposing any excess of strain on the bolt 1 after the nut has been drawn into contact with the washer with sufficient pressure to hold the fish plates or other parts securely together. Therefore, I wish to be understood as contemplating the use of any greater or less number of ratchet teeth with any greater or less number of yieldable lugs to adapt my device for use as conditions may require. However, it is always desirable that the number of ratchet teeth be a multiple of the number of yieldable lugs in order that the resistance to the turning of the nut may be distributed evenly around it, rather than that this resistance should be located at only one side of the bolt, imposing unbalanced strains on the parts of the mechanism. While thus affording an effectual means for preventing the unscrewing of the nut by presenting uniformly spaced lugs against the ratchet teeth of the nut, the washer 8 may be very economically manufactured in the form as herein illustrated, it only being necessary to form the annular groove 11 and the incisions 15 therein to form the yieldable lugs, leaving the washer 8 with its lugs and bearing surface of integral construction, ample strength and simple operation, adapted for the greatest durability and efficiency under the conditions of the uses for which it is more especially designed, as hereinbefore stated.

Having fully described my invention, what I claim as new and desire to secure by Letters Patent is:

1. In nut locking mechanism, the combination with a bolt and nut having corresponding threads and a part to be held in position thereby, of a washer interposed between the nut and the part to be held in position and surrounding the bolt, having a groove in its face presented toward the nut, substantially concentric to the bolt, and having a series of incisions in its convex surface extending in a direction inclined to the axis of the washer and bolt and opening into the groove in its face whereby lugs are formed which are yieldable in a direction parallel to the axis of the bolt, the nut being provided with teeth presented toward the yieldable lugs on the washer and adapted to engage therewith to prevent the turning of the nut, the washer having a plain bearing surface between the annular groove and the bolt which it surrounds, and the nut having a corresponding plain bearing surface adapted to engage with the bearing surface on the washer, and the bolt and washer each being provided with means for preventing their turning with respect to the part to be held in position, substantially as and for the purposes specified.

2. In nut locking mechanism, the combination with a bolt and nut having corresponding threads and a part to be held in position thereby, of a washer interposed between the nut and the part to be held in position and surrounding the bolt, having a groove in its face presented toward the nut substantially concentric to the bolt, and having a series of incisions in its convex surface extending in a direction inclined to the axis of the washer and bolt, and opening into the groove in its face, whereby lugs are formed which are yieldable in a direction parallel to the axis of the bolt, the nut being provided with teeth presented toward the yieldable lugs on the washer and adapted to engage therewith to prevent the turning of the nut, the washer having a plain bearing surface between the annular groove and the bolt which it surrounds, and the nut having a corresponding plain bearing surface adapted to engage with the bearing surface on the washer, the washer being provided with a series of recesses, each beginning in the region of the termination of one of the incisions and diminishing in depth toward the end of the yieldable lug formed by means of the incision, to admit the teeth of the nut and allow the bearing surfaces on the washer and nut, respectively, to make contact, and the bolt and washer each being provided with means for preventing their turning with respect to the part to be held in position, substantially as and for the purposes specified.

CLIFFORD N. GILMORE.

Witnesses:
 JAMES N. RAMSEY,
 CLARENCE PERDEW.